United States Patent
Planer et al.

(10) Patent No.: US 12,523,374 B2
(45) Date of Patent: Jan. 13, 2026

(54) VARIABLE ORIFICE RESTRICTION DEVICE

(71) Applicant: The Marley Company LLC, Charlotte, NC (US)

(72) Inventors: Alex Planer, Bethlehem, PA (US); Chris Ellingwood, Tannersville, PA (US); Austin Seese, Johnstown, PA (US); Patrick Villaume, Easton, PA (US)

(73) Assignee: THE MARLEY COMPANY LLC, Charlotte, NC (US)

(*) Notice: Subject to any disclaimer, the term of this patent is extended or adjusted under 35 U.S.C. 154(b) by 465 days.

(21) Appl. No.: 17/078,770

(22) Filed: Oct. 23, 2020

(65) Prior Publication Data

US 2021/0123598 A1   Apr. 29, 2021

Related U.S. Application Data

(60) Provisional application No. 62/926,397, filed on Oct. 25, 2019.

(51) Int. Cl.
  *F23N 1/02* (2006.01)
  *F23D 14/62* (2006.01)

(52) U.S. Cl.
  CPC ............. *F23N 1/027* (2013.01); *F23D 14/62* (2013.01)

(58) Field of Classification Search
  CPC ...................................................... F23L 13/02
  See application file for complete search history.

(56) References Cited

U.S. PATENT DOCUMENTS

| | | | | |
|---|---|---|---|---|
| 836,955 A * | 11/1906 | Worthington | ........... | F16K 15/02 137/546 |
| 891,967 A * | 6/1908 | Wiemann | ................... | F24F 7/02 454/359 |
| 2,004,948 A * | 6/1935 | Irsch | ........................ | F23L 11/02 236/45 |
| 2,027,942 A * | 1/1936 | Weeks | ....................... | F23N 1/02 236/26 R |
| 2,101,315 A * | 12/1937 | Kemp | ...................... | F23L 13/02 137/493.1 |
| 2,133,803 A * | 10/1938 | Brady | ...................... | F23L 11/02 236/45 |
| 2,242,667 A * | 5/1941 | Cunningham | .......... | F23L 11/02 137/500 |
| 2,251,822 A * | 8/1941 | Carlson | .................... | F23L 13/02 126/293 |
| 2,340,283 A * | 1/1944 | Vladu | ...................... | F23L 13/02 126/293 |
| 2,596,907 A * | 5/1952 | Ward | ....................... | F23L 13/02 236/45 |

(Continued)

FOREIGN PATENT DOCUMENTS

| CA | 2692384 A1 * | 8/2011 | .............. F23L 13/02 |
|---|---|---|---|
| CN | 105673899 A * | 6/2016 | |

(Continued)

*Primary Examiner* — Jorge A Pereiro
(74) *Attorney, Agent, or Firm* — Husch Blackwell LLP

(57) ABSTRACT

This application is directed to a device and method for providing a variable orifice restrictor to an air induction system to achieve an improved turndown ratio of an airflow rate. The devices of the invention improve turndown ratio by relying on a pressure differential.

23 Claims, 15 Drawing Sheets

(56) References Cited

U.S. PATENT DOCUMENTS

| | | | | |
|---|---|---|---|---|
| 2,808,992 A * | 10/1957 | Franks | | F23L 11/02 236/45 |
| 2,978,184 A * | 4/1961 | Franks | | F23L 13/00 236/45 |
| 3,206,119 A * | 9/1965 | Steinen | | F23L 13/02 236/45 |
| 4,046,318 A * | 9/1977 | Ripley | | F24H 15/33 126/285 B |
| 4,329,967 A * | 5/1982 | Levenberg | | F23L 11/005 126/293 |
| 4,369,718 A * | 1/1983 | Eppinger | | F23L 11/005 110/163 |
| 10,388,328 B1 * | 8/2019 | Tan | | B01D 46/0036 |
| 2002/0144737 A1 * | 10/2002 | Zelczer | | F15B 15/1447 137/601.17 |
| 2002/0179159 A1 * | 12/2002 | Zelczer | | F16K 1/221 137/601.09 |
| 2006/0090745 A1 * | 5/2006 | Cormier | | F23L 13/02 126/285 R |
| 2009/0211540 A1 * | 8/2009 | Yin | | F24H 9/0031 122/14.21 |
| 2014/0373826 A1 * | 12/2014 | Cote | | F24D 19/1084 126/110 A |
| 2015/0075373 A1 * | 3/2015 | Miller | | B01D 46/446 96/400 |
| 2016/0265768 A1 * | 9/2016 | Park | | F23L 13/02 |
| 2020/0309412 A1 * | 10/2020 | Ono | | F23D 14/02 |

FOREIGN PATENT DOCUMENTS

| | | | | |
|---|---|---|---|---|
| DE | 19652205 A1 * | 6/1998 | | F23L 13/02 |
| EP | 2871393 A1 * | 5/2015 | | F16K 15/03 |
| JP | S63137236 U * | 9/1988 | | |
| KR | 100944370 B1 * | 3/2010 | | |
| KR | 20150031705 A * | 3/2015 | | |
| KR | 20170103293 A * | 9/2017 | | |
| WO | WO-2017006758 A1 * | 1/2017 | | F16L 55/00 |
| WO | WO-2019182237 A1 * | 9/2019 | | F23L 13/04 |

* cited by examiner

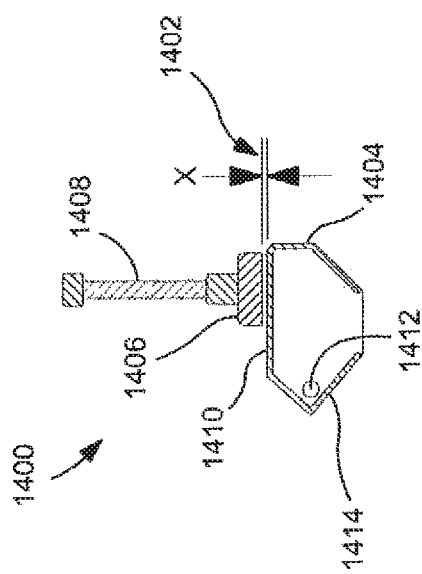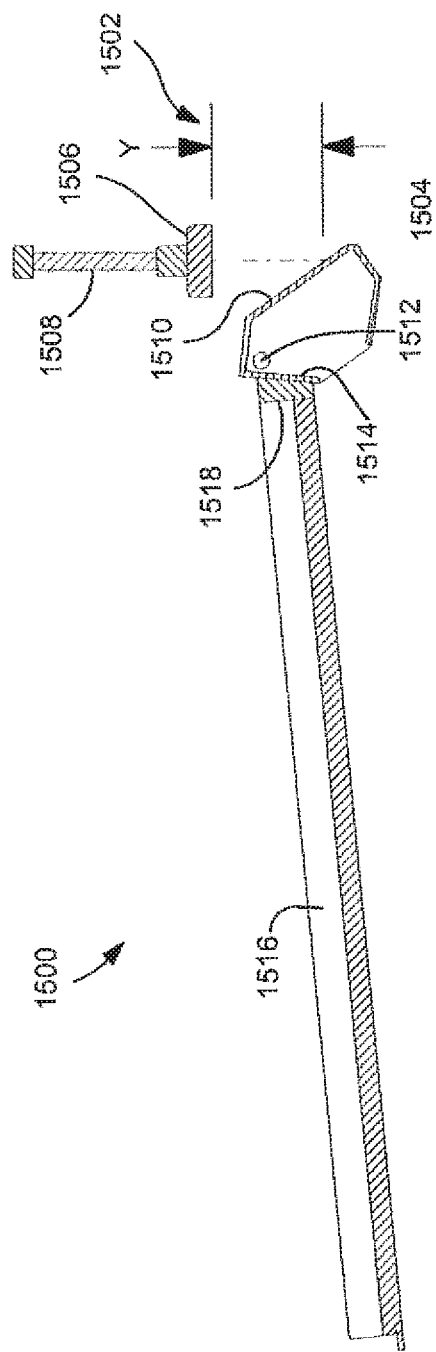

VARIABLE ORIFICE RESTRICTION DEVICE

CROSS-REFERENCE TO RELATED APPLICATIONS

This application claims priority to U.S. Provisional Application No. 62/926,397, filed on Oct. 25, 2019, which is incorporated herein by reference in its entirety.

BACKGROUND OF THE INVENTION

Field of the Invention

The present invention generally relates to air handling systems such as (without limitation) an air induction system of a gas fired boiler.

Description of the Related Art

In previous systems variability of airflow was limited by blower/fan maximum and minimum speed that is typically at a 5 to 1 ratio, wherein the minimum operating blower rpm is normally 20% of the maximum operating blower rpm. Typical methods of achieving a high turndown ratio include: introducing excess air, multiple gas trains, multiple blowers, multiple combustion assemblies, motor controlled butterfly valves, and flaps that cover half of the air opening. Previous equipment normally operates restricted by the combustion blower and gas valve capabilities. Such prior systems required more complexity and cost to achieve the same flexibility in air flow rates, such as the required use of complex electrical components; or failed to provide the desired flexibility at both ends of the air flow spectrum, such as when reduced building load requirements exist.

Other technologies capable of reducing building load output are controlled electronically with the integration of other secondary equipment. This equipment is both space consuming and more expensive than the proposed technology. Additionally, prior systems failed to effectively incorporate backflow prevention capability, especially in conjunction with a variable orifice restriction device. Such shortcomings are overcome by the present invention by eliminating the need for these secondary items, thereby: promoting savings in materials cost, reducing labor hours in both assembly and calibration time, as well as reducing overall space requirements inside of the appliance and facility in which they are installed.

SUMMARY OF THE INVENTION

The present invention provides a solution to achieve an improved turndown ratio of air flow rate for an air induction system though a variable orifice restrictor when applied to systems such as water heating, boiler, and furnace technologies in residential, commercial, and light industrial heating applications. In certain embodiments, the invention provides for a turndown ratio of air flow rate for an air induction system to a value better than 5 to 1. The variable orifice restrictor is easily incorporated into an existing system design with a variable speed blower/fan without adding complexity to the system while increasing system efficiency. The variable orifice restrictor requires no electrical components and can provide backflow prevention. A variable orifice restrictor of the present invention allows the unit to stretch that ability by mechanically limiting the potential combustion air at atmospheric pressure available to the other combustion components. This allows the appliance to operate more in-line with what the building load is during days when full capacity is not required.

A housing is provided that supports at least one flap assembly that hinges. The flap assembly can operate by rotation about the hinge to expose one or more openings in the housing that act as an orifice(s). The flap assembly may be held shut in low flow situations, by the forces of gravity, and the use of one or more of the following: magnets, electro/magnets, weights, springs, and or tension bands. In one embodiment, the flap assembly is held shut in low flow situation, by the forces of gravity, and the use of one or more weights. The housing may have provisions to support the closing mechanisms mentioned.

The housing is inserted in the air-intake on the suction or discharge side of a blower/fan and is to be sealed such that the air flows through the housing and the intended openings/orifices. The housing supports the flap assembly by a hinge acting between the flap assembly and the housing. An airtight seal is provided by the flap assembly and housing, in conjunction with the ducting to prevent back-flow. Backflow prevention is achieved by sealing surfaces using gaskets and other means between the housing, the surrounding assembly, and the housing to the flap assembly.

The flap assembly provides a variable orifice profile across the RPM range of the blower/fan. On the low end range of the fan, the flap assembly remains closed, and the opening (or openings) exposed by the flap assembly act to constrict the amount of air flowing or to gate it off completely. The flap assembly opens when there is an increase in pressure differential across the flap assembly and closes when the pressure differential decreases to a set-point. As the RPM of the fan increases, pressure differential increases to a designed set-point whereupon the flap assembly overcomes the gravitational forces applied to the flap assembly and begins to open, thereby allowing air to flow, or more flow of air. The flap assembly is designed and fabricated to have an area at the top of the flap that extends behind the hinge axis that is magnetic. Acted upon by magnets, the flap may further restrict the low speed, low pressure flow of air. When airflow increases, pressure differential builds to break the holding force, at which point the flap begins to open and allow more air to flow through the system.

Holding force, which is used to keep the flap assembly in a closed position, may be adjusted by the one or more magnets, weight of the flap assembly, weight arranged on the flap assembly, and angle of the resting/closed position of the flap assembly. Changing these characteristics, change the airflow characteristics of the variable orifice restrictor overall, thus tuning the system for the desired turndown. The flap assemblies in conjunction with the housing and a duct box are not limited to one shape, size, or opening. These can vary based on the system requirements. There are also no specific limitations as to the size range the variable orifice restrictor can be applied to with respect to the British Thermal Unit per hour (BTUh) capacity of a given appliance. Current technology in this space ranges from 40,000 BTUh to 12,000,000 BTUh heating output. Accordingly, in certain embodiments, the variable restriction device is used with an appliance having a heating output of 40,000 BTUh to 12,000,000 BTUh An exemplary embodiment is directed to a variable orifice restrictor for an air induction system of, for example, a gas fired boiler. The variable orifice restrictor may comprise a ducting box having a box inlet and a box outlet, a housing having a seat, a housing inlet and a housing outlet, and a flap assembly hingedly attached to said housing and said housing insertedly attached to said ducting box, wherein the variable orifice restrictor provides a turndown ratio of an air flow rate through said air induction system via said flap assembly, the housing, and the ducting box. The exemplary embodiment above may further include a flap assembly comprising a low air flow rate orifice calibrated to a predetermined maximum airflow. The embodiment may further comprise a closed position of the flap assembly relative to the housing whereby the flap assembly rests against the seat and seals thereto. Another exemplary embodiment may have a closed position that coincides with a magnetic force applied to the flap assembly by an adjustable magnet assembly. Another exemplary embodiment may comprise a variable orifice restrictor of the above, wherein the turndown ratio of an air flow rate is better than 5 to 1. In an alternative exemplary embodiment, the variable orifice restrictor may be allied to a boiler that is oil fired.

BRIEF DESCRIPTIONS OF DRAWINGS

The foregoing summary, as well as the following detailed description of the invention, will be better understood when read in conjunction with the appended figures. For the purpose of illustrating the invention, the figures demonstrate embodiments of the present invention. It should be understood, however, that the invention is not limited to the precise arrangements, examples, and instrumentalities shown.

FIG. 14 depicts one embodiment shown in a cross section of an adjusting screw, magnet, and flap pivot, wherein the flap pivot in the closed position with the gap X at a preset minimum limit.

FIG. 15 depicts one embodiment shown in a cross section of an adjusting screw, magnet, flap pivot and flap cover; the flap pivot and flap cover in an open position with the gap Y at an enlarged size.

DETAILED DESCRIPTION OF THE INVENTION

Figure 1:
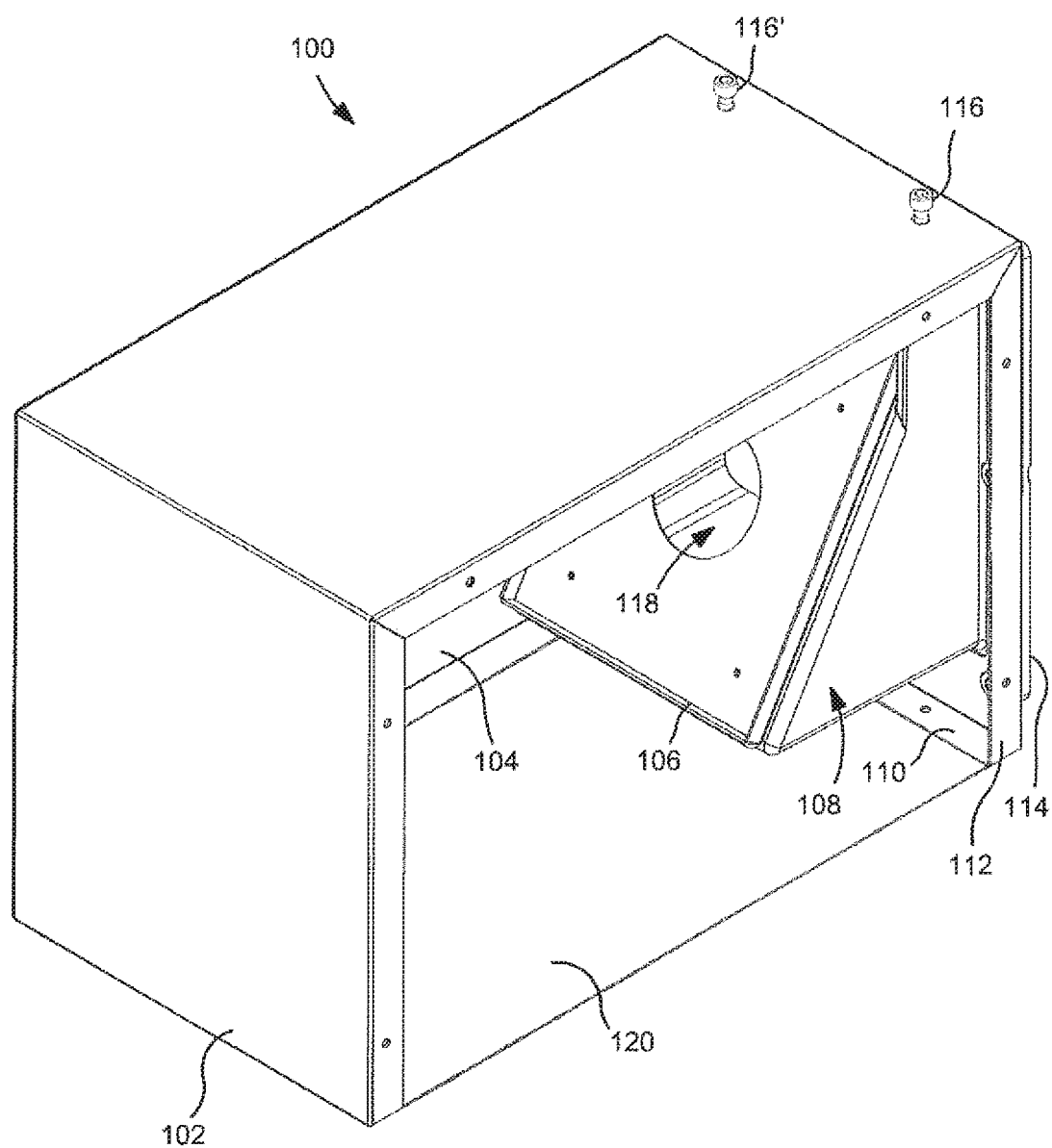
FIG. 1 depicts one embodiment shown in an isometric view of a housing contained within a ducting box with the front cover removed. The flap assembly with an orifice is depicted in the closed position and the adjustment screws installed.

The variable orifice restriction device of the present invention controls airflow in a system having a variable speed blower/fan, such as a gas/air fired boiler, in which the flow of air is to be attenuated beyond the capability of the variable speed blower/fan. The variable orifice restriction device further acts as a check valve to prevent back flow of air in the system, such as might be caused by a disruption of the discharge air in the output stream of the system, either during operation, or when the blower/fan is not powered.

As used herein, the term "about" when referring to a measurable value such as an amount, a temporal duration, and the like, is meant to encompass variations of ±0.20% or ±10%, more preferably ±5%, even more preferably ±1%, and still more preferably ±0.1% from the specified value, as such variations are appropriate to perform the disclosed methods.

In one embodiment, there is a housing inserted into the air-intake on the suction or discharge side of a blower/fan, and is to be sealed such that the air flows through the housing and the intended openings/orifices and prevents back-flow. The housing may be disposed within a box that ducts the intake air to and away from the housing. The housing, positioned within the box about a box inlet and sealed around the perimeter housing inlet, comprises a flap assembly mounted about the housing outlet and hinged about a horizontal axis at the upper portion of the housing and flap assembly. The flap assembly may be held shut in situations of low flow, by the forces of gravity acting on the flap assembly, and/or by the use of one or more of the following: magnets, electro/magnets, springs, weights, and/or tension bands. In one embodiment, the flap assembly may be held shut in situations of low flow, by the forces of gravity acting on the flap assembly, and/or by the use of one or more weights. The weights maybe attached to the flap assembly or be integral with the flap assembly. The flap assembly may be held, or limited by a limiter, to a specific open position relative to a specific airflow, thereby reducing or eliminating oscillation of the flap assembly during operation such as when air is flowing. The rate of movement of the flap can also be regulated by a damper or spring. The flap assembly acting as a gate, and in conjunction with the housing assembly, acts to restrict the flow of air from inlet to outlet of the housing and then from the inlet to the outlet of the box, and ultimately through the system.

Housing: The housing may be constructed as an assembly having an inlet side and an outlet side and provide a seat for the resting or closed position of a flap assembly. The housing may have a mounting flange with a hole about the center defining the housing inlet. The housing may also include two sides and a bottom forming an angled protrusion. The angled protrusion may have an angled surface having a hole about which the sealing seat is formed and through which air exiting the housing may flow. The seat may have an angle at or between 90 degrees (vertical) to 0 degrees (horizontal). The housing may provide a resting or closed position of the flap assembly having an angle. In certain embodiments, the flap assembly may have an angle, for example, of about 45 degrees, or alternatively an angle of about 22.5 degrees to 67.5 degrees. The seat may be a flat surface as part of the angled surface or be a raised lip to which a corresponding gasket or seal may rest when a flap assembly is closed.

The housing sides may additionally exhibit tabs extending vertical and horizontally away from the housing flange. The tabs may provide a through hole about which a pin or rod may be placed to provide a pivot for the flap assembly. The housing flange may be fabricated to include through holes about the periphery to facilitate attachment to a ducting box or other structure. The housing may be formed from sheet material, cast, molded, by a combination thereof, or by other means known in the art of forming three dimensional parts. The housing may further be constructed from materials such as metal, plastic, composites, or other materials man-made or natural.

Box: A box, formed with an inlet hole and outlet hole, may contain the housing. The box may be formed from a box body and a cover or covers that are permanently or removably attached from the box body, wherein an airtight box is configured to prevent air leaks about the joining surfaces. Inlet and outlet holes may be fabricated in separate parts that make up the box, or within the same part. Inlet and outlet holes may align or not align, reside on adjacent surfaces, or be disposed on opposite surfaces. The box may be fabricated from sheet stock bent to shape to form sub-assemblies of two sides and a top with separate covers. Alternatively, the box may be cast from metal, or formed from plastic or composites.

The box may have attached thereto adaptor flanges for joining external ducting. The adaptor flanges may be attached via fasteners, welding, or other known joining methods, and sealed to prevent air leaks and aid in backflow prevention. Adaptor flanges may be formed from similar materials as described for the box.

Covers: A front, side, bottom, and back cover may be formed and attached to the box body by means of fasteners or welding, or other known joining methods. Holes may be formed in the box body and/or covers to provide a means for the air to enter and exit the box formed from assembly of the covers to the box body. The box body and/or covers may have predrilled/punched flanges to aid in the assembly of the covers to the box body.

Flap Assembly: The flap assembly in one embodiment may be formed from a flap cover, a flap gasket, a flap back plate, a flap pivot, a flap back plate, and fasteners. The flap assembly is not limited to one shape, size, or opening or to a particular material. These can vary based on the system that the device is applied to. In one embodiment, a flap assembly incorporates a back-flow prevention device thus eliminating the need for additional components. A flap assembly may have one or more openings that act as an orifice(s) thereby tuning the flap assembly by a predetermined amount to regulate the initial opening, and or, closing flow rate. These orifice(s) may be fabricated into the flap cover, and the orifice count and/or size may be determined by the size of the overall system and necessary performance characteristics. The flap cover may be fabricated from metal, composites or plastic and formed by bending, casting, molding or known forms. The material and method of manufacture may affect the performance of the flap assembly due to, among other factors, weight.

The flap gasket is sandwiched between the flap cover and the flap back plate and held in position by fasteners, such as screws, or by adhesive. The flap assembly, and particularly the gasket of the flap assembly, when in the closed position against the housing, mates with the sealing surface of the housing thereby restricting air flow past the flap assembly and relying on the orifice for continued air flow when closed. The flap gasket may be slightly smaller or equal in dimension to the width and height of the flap cover. The flap back plate may be smaller than the size (such as length and width) of the gasket and particularly smaller in size than the opening defined by the size of the sealing surface of the housing.

The flap pivot is attached to the flap cover via pivot pin with corresponding holes in the flap cover and flap pivot. The two may also be welded together or formed from a single part. The flap pivot comprises a front surface, an upper surface and two side surfaces. The upper surface may be fabricated to be magnetic or partially magnetic, such that it contains material that attracts magnets (for example, iron based material). The flap cover and flap pivot may be fabricated from metal, plastic, or composites, and may comprise portions, such as inserts, that are iron based to coincide with the use of magnets. The flap pivot, in one embodiment, may comprise a hole at each side surface corresponding to holes in the upper portion of the housing, such that a pivot pin or rod may be driven through these holes to provide a hinge about which the flap assembly will pivot. The upper surface extends behind the hinge axis and away from the flap cover to allow the magnets to have sufficient surface to act upon. The flap assembly may be configured to swing up and down about the horizontal axis pivot. The flap pivot may be fabricated in a way that when the flap assembly is closed or in the resting position on the housing, and the housing mounted in the box, a flat surface is formed that coincides with the upper surface of the box, such that the surfaces are parallel. When the flap assembly pivots open, the upper surface of the flap pivot rotates away from the magnetic assembly.

Magnet Assembly: In an embodiment, one or more magnet assemblies may adjustably interact with the flap assembly, by for example, attachment to the box. The magnet assembly may comprise a threaded fastener, a nut, and a magnet. The threaded fastener has a wrenching end and a magnet end. A magnet may be attached to the fastener about the magnet end and adjusted at the wrench end until the desired magnetic force is applied to the flap pivot. The magnets may be adjusted toward or away from the flap pivot thereby increasing/decreasing the magnetic forces imparted to the flap pivot (or the magnetic portion thereof) and increasing/decreasing the closing/opening forces imparted to the flap assembly.

The nut, such as a weld nut, may be affixed to the box about a flap-adjusting-through-hole in the box provided to coincide with the installed location of the flap pivot, and specifically about the magnetic portion of the flap pivot. The threaded fastener may pass through the flap-adjusting-through-hole and threaded weld nut. The fastener may be a hex headed, socket head or set screw. A locking nut, or compound, may be further applied to the fastener to limit unwanted movement. Alternatively, the magnetic assembly may be held in position by a bracket or surface extending from the housing.

If so desired, an electro-magnetic may alternatively be used in place of a permanent magnet for the magnet assembly to adjust the forces applied to the flap assembly. The electro-magnet may be attached in the same manner as the magnet assembly and initially adjusted to the desired range of distance and force for the given range of electrical current available. Variation of the electrical current can be applied to the electro-magnet to change the magnetic forces applied and therefore change the pressure differential required to open the flap assembly.

Regulator: Regulation by a damper or spring may act across the entire motion of the flap assembly or only for a portion thereof. A damper may be of the linear type or the rotary type. A linear damper may be attached to the side or top of the flap assembly and the corresponding side or top of the housing or box. A linear damper may be mounted in the outlet side (downstream) of the housing, or inside the housing, upstream of the flap assembly. A rotary damper may act on or about the pivot point of the flap pivot and housing. Likewise, the flap assembly may comprise a spring mounted between the flap assembly and the housing or box. The spring may act to assist, or resist opening and may act on all or a portion of the flap assembly travel. A suitable spring may be a coil spring for acting in the linear movement or torsional movement, operating about the pivot as with the rotary damper.

Limiter: A limiter may be employed to limit the swing of the flap assembly. Such a limiter may comprise a panel, a bolt, a combination of both, or some other adjustable device extending into the path of the flap assembly, thereby limiting its movement. For example, a rod or bolt may be mounted through the upper surface of the ducting box, extending downward to a location within the ducting box and in the arcing path of the flap assembly. The limiter may be extended to limit the swing of the flap to about 90 degrees of arc. Alternatively, the limiter may limit the swing of the flap to about 45 degrees or less. The limiter may also, for example, be a screen panel having various types of perforations or hole patterns.

An airtight seal may be provided at all mating surfaces and may be achieved by sealing surfaces between the housing and the box, and the housing to the flap assembly as well as external ducting to the box and its constituent parts. Gaskets, O-rings, and/or sealing compounds may be used to create the desired seal between surfaces.

Operation: Air passes through the box inlet and into the housing inlet. The flap assembly may be fabricated to provide a variable orifice profile across the RPM range of the blower/fan. On the low end range of the fan, the flap assembly remains closed, and the opening (or openings) in the assembly acts to restrict the amount of air that flows through. As the RPM of the fan increases, the pressure differential increases to a designed set-point where the flap assembly begins to open and thus begins to allow air to flow. For sufficiently high flow/high pressure conditions, the flap assembly will open to a degree consistent with the flow rate and pressure developed within the housing under/behind the flap assembly. The holding force of the closing mechanism may be adjusted to change the opening airflow of the flap. As the fan speed increases, so will the opening through the housing (as the flap opens more). Air will continue to flow through the opening at a varied rate dependent on the angle of the flap assembly. Upon a sufficient flow rate and pressure, the flap assembly will fully open, providing maximum airflow through the housing and box and to the system. Upon a decrease in airflow and pressure, the flap assembly will draw closed. The gap between the flap pivot will likewise reduce, thereby increasing the force applied by the magnet to the flap pivot and thus the flap assembly. At the closed position the magnet will induce the greatest force on the flap pivot.

Embodiments of the invention are illustrated in the accompanying drawings in which:

FIG. 1 is an isometric view illustrating a variable orifice restricting device 100 with the front cover removed. Variable orifice restrictive device 100 may comprise a box body 102, box back cover 104, flap assembly 106, housing 108, box body lower flange 110, box body side flange 112, housing mounting flange 114, adjusting screw 116, 116', and bottom cover 120. Housing 108 is inserted into the box body via an inlet hole, such as the box body housing mounting inlet 926 of FIG. 9, wherein the housing mounting flange 114 may mate with the outer surface of the box body 102. The variable orifice restrictive device 100 may make use of holes about the flange, such as housing flange mounting holes 208 of FIG. 2, to secure the device to a part of the system.

The flap assembly 106 may also include a restricting orifice 118 and a cover (not shown) over the restricting orifice 118 to provide the backflow prevention. In this embodiment shown, the flap assembly 106 appears closed as though no airflow is present and/or there is insufficient pressure differential acting on the flap assembly 106 to overcome the weight. Fastening holes 122 (not shown) may be provided in the box body and covers (for example back cover 104) to facilitate attachment of the various covers, which may have corresponding holes for inserting fasteners (not shown). Weld nuts may be used on the box body 102 to aid the use of fasteners, such as to secure the covers. Weld nuts and fasteners may be of common threaded type or other types known in the art to secure the covers in place and are generally not shown in the figures to reduce clutter in the drawing. Although the box body 102 may be substantially rectangular in shape, it may be also fabricated in other shapes, such as cylindrical, or a combination of shapes resulting in a more complex overall shape.

Figure 2:
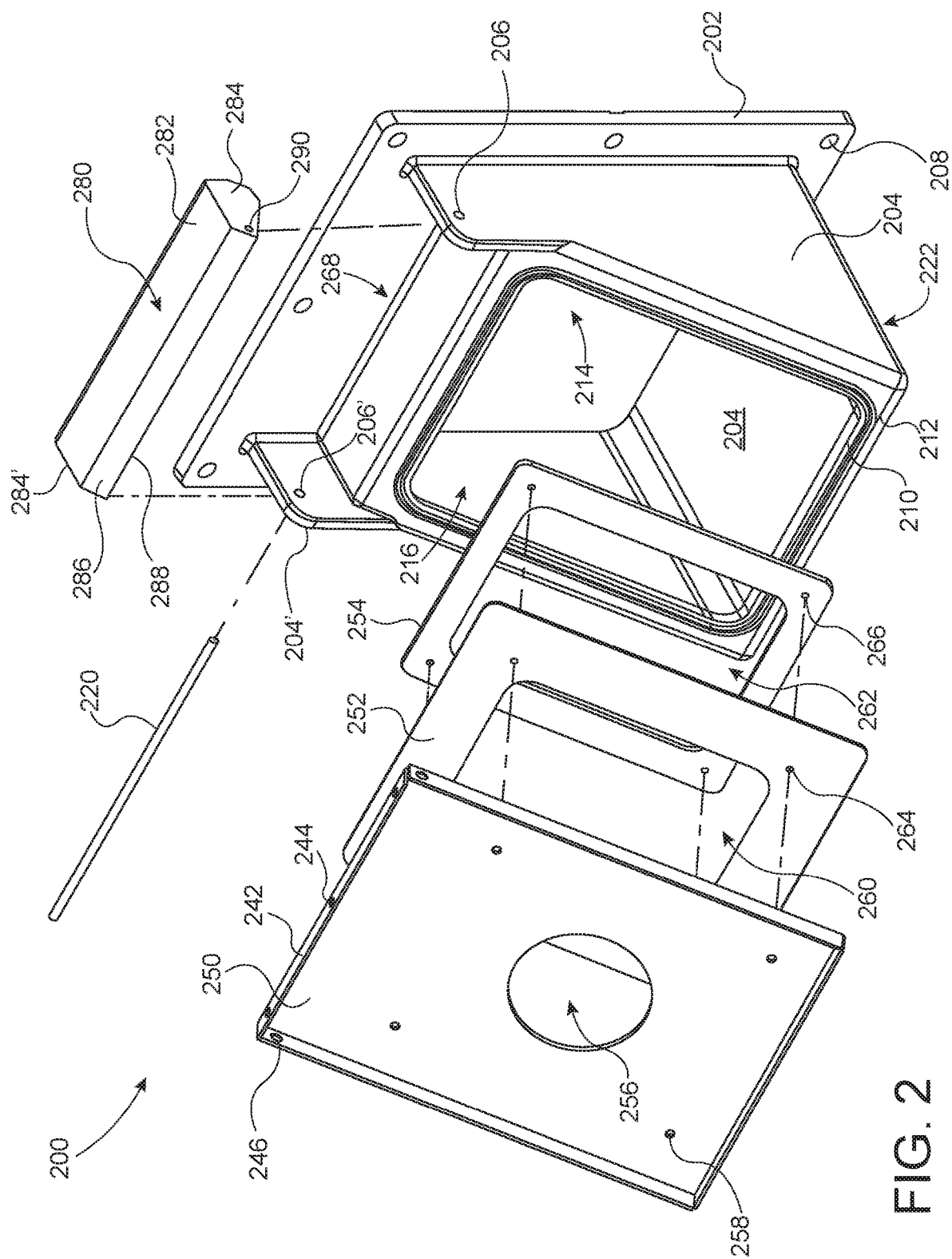
FIG. 2 depicts one embodiment shown in an exploded view of a housing and flap assembly for insertion into the ducting box, the housing flange mounting from the inside of the box.

FIG. 2 is an isometric exploded view illustrating a variable orifice assembly 200 as might be used in the embodiment of FIG. 1. Variable orifice assembly 200 comprises a housing mounting flange 202, housing side 204, 204', housing pivot pin hole 206, 206', housing flange mounting holes 208, housing to flap seat lip 210, housing to flap seal 212, housing inlet opening 214, housing outlet opening (orifice) 216, housing bottom 218, pivot pin 220, housing 222, flap cover upper flange 242, flap cover upper flange fastener holes 244, flap cover pivot pin holes 246, flap cover 250, flap gasket 252, flap backplate 254, flap cover fastener holes 258, flap gasket hole 260, flap backplate hole 262, flap gasket fastener holes 264, flap backplate fastener holes 266, cavity (between back and sides) 268, flap pivot 280, flap pivot upper surface 282, flap pivot side 284, 284', flap pivot front surface 286, flap pivot flange 288, flap pivot pin holes 290. The flap cover 250 may additionally comprise flap cover restricting orifice 256. Fasteners (not shown) may be used to secure the flap gasket 252, and flap backplate 254 by means of the flap cover fastener hole 258, flap gasket fastener hole 264, flap backplate fastener hole 266 to form part of a flap assembly, such as the flap assembly 106 of FIG. 1. Flap pivot 280, is secured to the flap cover 250 at the flap cover upper flange 242 by screws or welding (not shown) and in conjunction with the Pivot pin 220, housing pivot pin holes 206, 206', and flap pivot pin holes 290, to provide for the hinged attachment of the flap assembly to the housing 222. Such hinged attachment allows the flap assembly to swing in an upward arc varying the orifice and restricting airflow, dependent on airflow, back pressure differential, flap assembly weight, magnetic force of the adjustable magnets, and any limiting features that might be employed, as later shown below with respect at least to FIGS. 12, 13, and 16. Note the secondary pivot pin hole of the flap pivot 280 is provided in the distal flap pivot side 284' and hidden from view by the flap pivot front surface 286.

Figure 3:
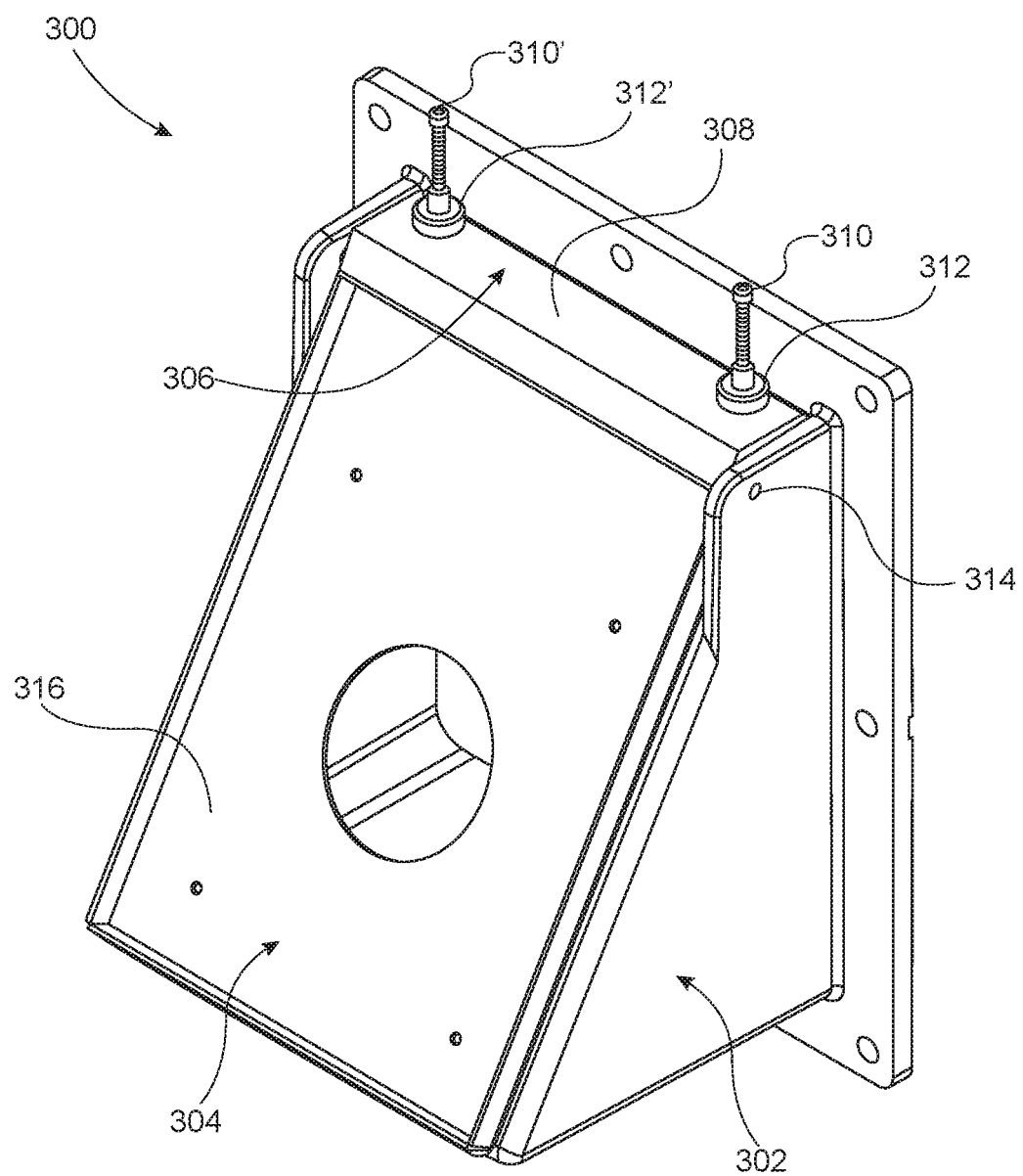
FIG. 3 depicts one embodiment shown in an isometric view of a housing and orifice containing flap assembly with adjustable magnets positioned over and proximal to the magnetic portion of the flap assembly with the flap assembly in the closed position.

FIG. 3 is an isometric view illustrating a variable orifice assembly 300 in the closed position. The variable orifice assembly 300 comprises a housing 302, adjusting screws 310, 310', magnets 312, 312', a pivot pin 314, and a flap assembly 304, a flap pivot 306, a flap pivot upper surface 308, and a backflow prevention cover 316. The backflow prevention cover 316 may be made part of the flap assembly 304 by use of fasteners (not shown). The illustration further depicts the adjusting screws 310, 310', and corresponding magnets 312, 312' in close proximal to the flap pivot upper surface 308 of the flap pivot 306 to provide additional closing force offered by the magnets 312, 312'. The position of the adjusting screws 310, 310', and corresponding magnets 312, 312' may be held in place by a box body, such as that shown in FIG. 1, but absent here for visual clarity. The variable orifice assembly 300 in FIG. 3 includes a restricting orifice. In other embodiments, the variable orifice assembly does not include a restricting orifice.

Figures 4, 5:
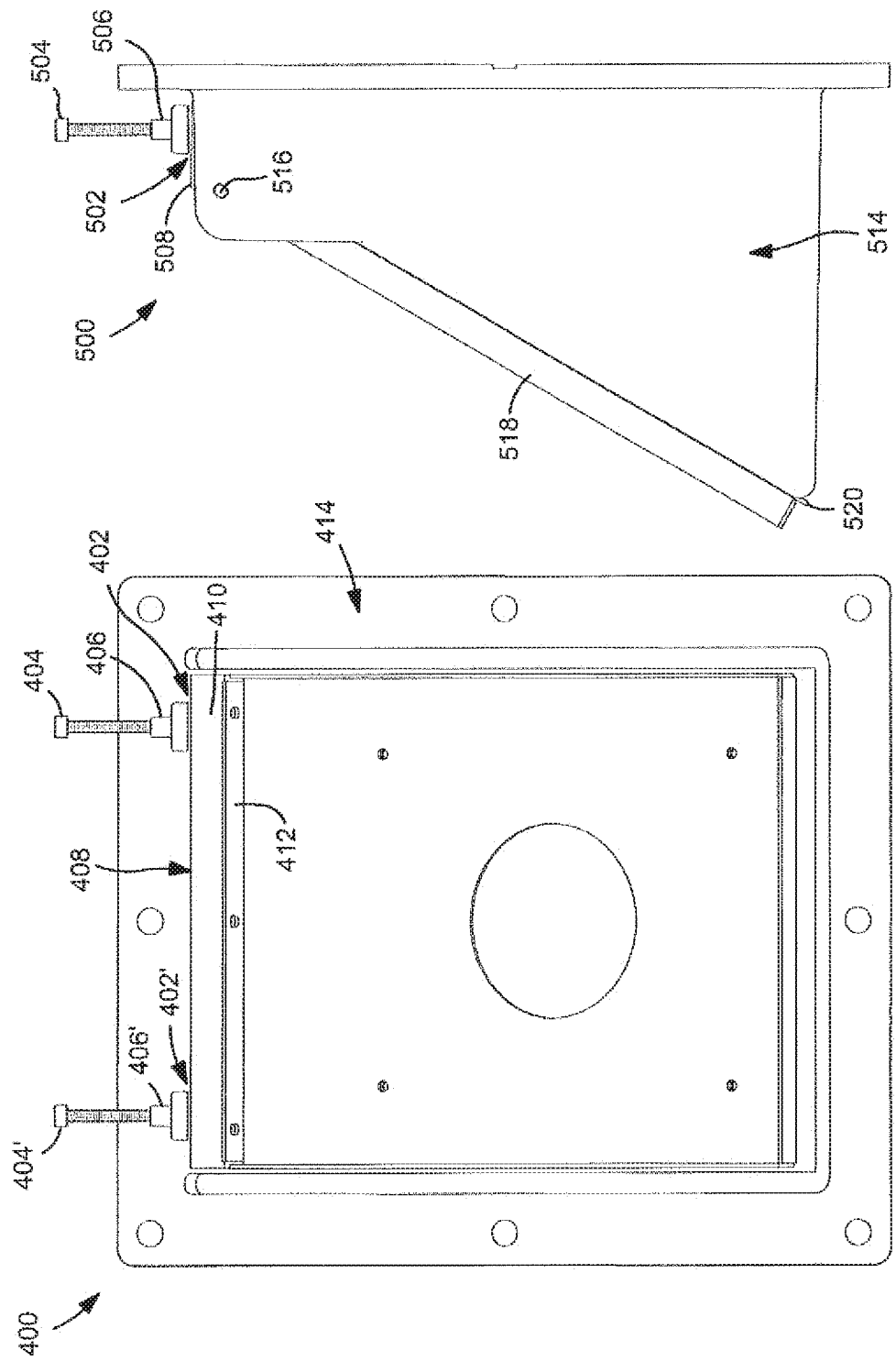
FIG. 4 depicts one embodiment shown in a front view of a housing and orifice containing flap assembly with adjustable magnets positioned over and proximal to the magnetic portion of the flap assembly with the flap assembly in the closed position.
FIG. 5 depicts one embodiment shown in a side view of a housing and orifice containing flap assembly with adjustable magnets positioned over and proximal to the magnetic portion of the flap assembly with the flap assembly in the closed position.

FIG. 4 is an orthogonal front view illustrating a variable orifice assembly 400, in the closed position, comprising gaps 402, 402', adjusting screws 404, 404', magnets 406, 406', flap pivot upper surface 408, flap pivot front surface 410, flap cover upper flange 412, and housing 414. The box body (not shown), securing the position of the adjusting screws 404, 404', and corresponding magnets 406, 406', is hidden from view for clarity so one can see the gap 402, 402'. The adjusting screws 404, 404', and corresponding magnets 406, 406' are adjusted up or down to narrow or widen the gaps 402, 402' between the magnets 406, 406' and the flap pivot upper surface 408. The adjusting screws 404, 404', and corresponding magnets 406, 406' may be adjusted such that gap 402, is the same, or different to gap 402'. The gaps 402, 402' may be eliminated if a further closing force is desired by the additional magnetic force available when one or more of the magnets actually contact the flap pivot upper surface 408. One or more adjusting screws 404, 404', and corresponding magnets 406, 406' may be used.

FIG. 5 is an orthogonal side view illustrating a variable orifice assembly 500 in the closed position similar to that depicted in FIG. 4. The variable orifice assembly 500 may comprise a gap 502, adjusting screw 504, magnet 506, flap pivot upper surface 508, housing 514, pivot pin 516, flap cover 518, and flap gasket 520, and depicts only the screw nearest the observer. As mentioned previously herein, the device may use one adjusting screw and corresponding magnet, or multiple adjusting screws and corresponding magnets. The device may operate without any adjusting screw and magnet. When closed, the flap gasket 520 seats against the seal of the housing 514, such as the seal 212 depicted in the embodiment of FIG. 2, to cause an airtight seal. Sealing is assisted by the magnetic force applied relative to the size of gap 502.

As depicted in FIG. 5, the bottom surface of the housing 514 has a slight upward slant from the mounting flange extending outward to the left (as viewed in the depiction). This may aid in removal of the housing 514 from a box body, such as for example, box body 102. Mounting of adjusting screws and magnets to a box body may also aid in remove of the housing lessening any interference the adjusting mechanism might otherwise cause if mounted to the housing directly and protruding outward.

Figure 6:
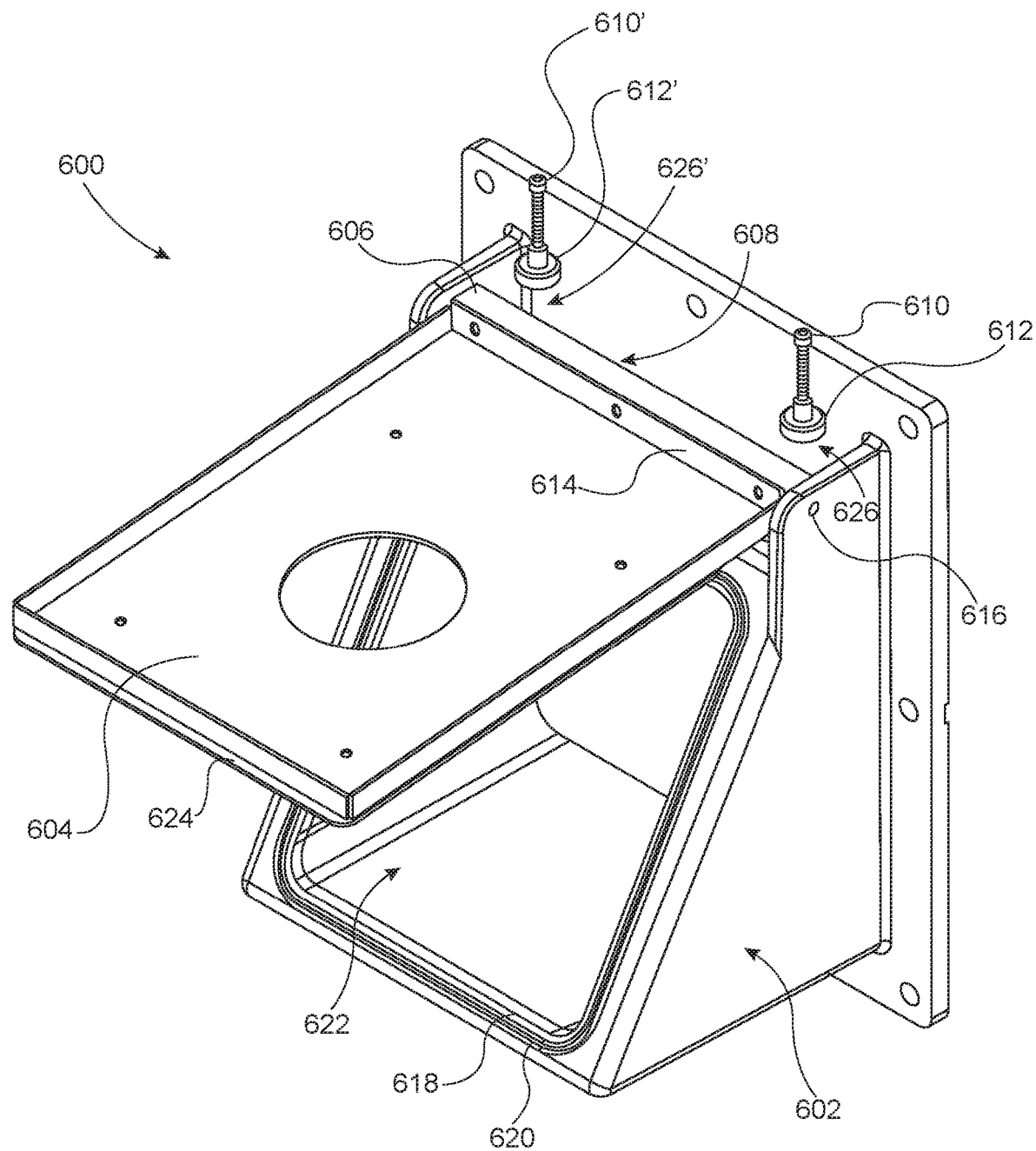
FIG. 6 depicts one embodiment shown in an isometric view of a housing and orifice containing flap assembly with adjustable magnets positioned over and distal to the magnetic portion of the flap assembly with the flap assembly in the open position.

FIG. 6 is an isometric view illustrating an open position of a variable orifice assembly 600 comprising a housing 602, flap assembly 604, flap pivot 606, flap pivot upper surface 608, adjusting screws 610, 610', magnets 612, 612', flap cover upper flange 614, pivot pin 616, lip 618, seal 620, opening (orifice) 622, flap gasket 624, gap 626. As described with respect to FIG. 4, a box body, securing the position of the adjusting screws 610, 610', and corresponding magnets 612, 612', is hidden from view for clarity. A flap pivot 280 is also hidden from view for the same reason. The open position may be that caused when airflow through opening (orifice) 622, and back pressure differential behind flap assembly 604, is sufficient to overcome the weight and magnetic closing/sealing force of the magnets 612, 612'.

In the illustration, the flap pivot upper surface 608 of the flap pivot 606, has rotated down and away from the magnets 612, 612' about the pivot pin 616. As the flap pivot rotates downward about the pivot pin 616, the magnetic force applied to the flap pivot upper surface 608, is increased.

Figures 7, 8:
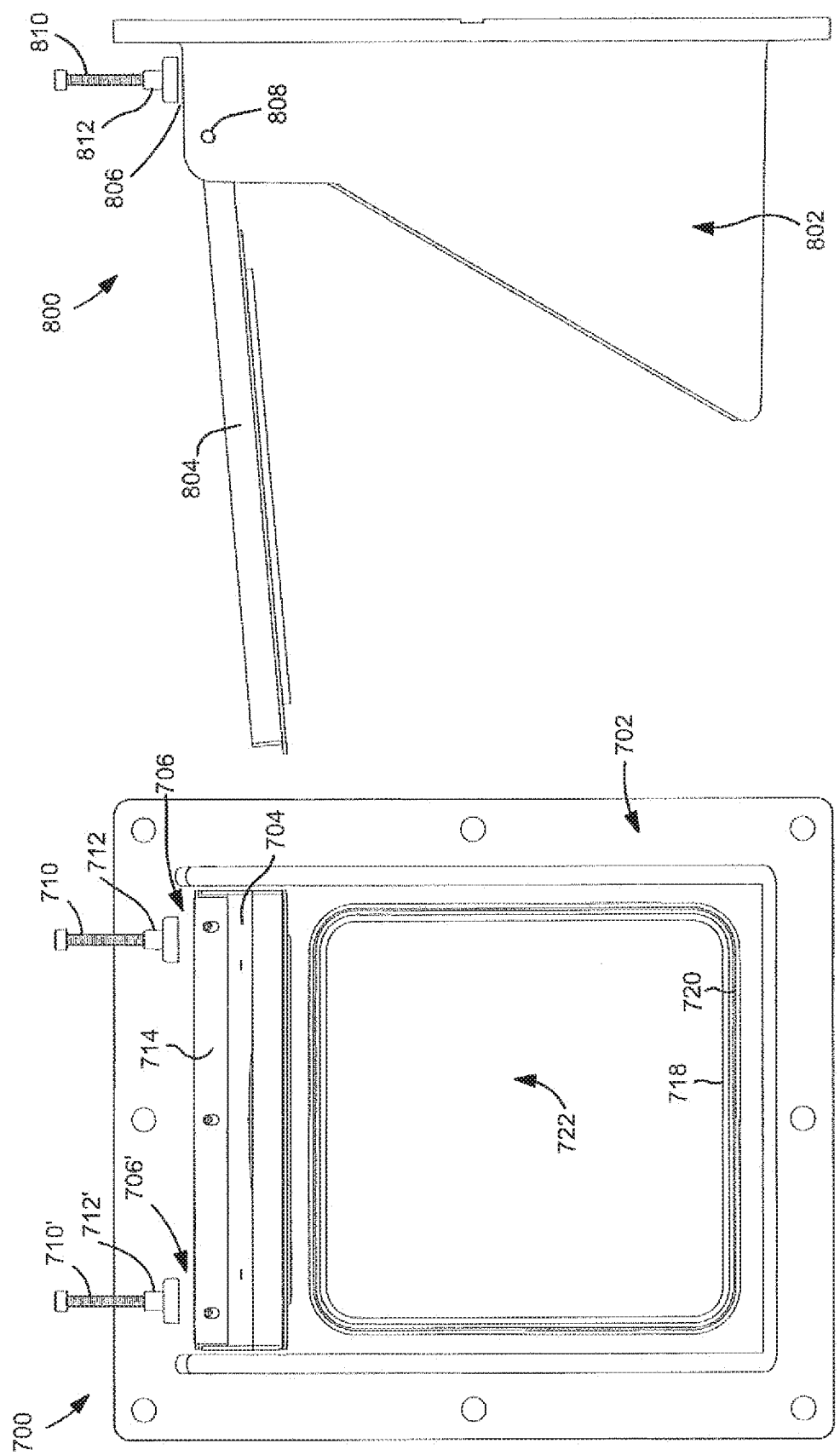
FIG. 7 depicts one embodiment shown in a front view of a housing and orifice containing flap assembly with adjustable magnets positioned over and distal to the magnetic portion of the flap assembly with the flap assembly in the open position.
FIG. 8 depicts one embodiment shown in a side view of a housing and orifice containing flap assembly with adjustable magnets positioned over and distal to the magnetic portion of the flap assembly with the flap assembly in the substantially open position.

FIG. 7 is an orthogonal front view illustrating an open position of a variable orifice assembly 700 a housing 702, flap assembly 704, gap 706, 706', adjusting screws 710, 710', magnets 712, 712', flap cover upper flange 714, lip 718, seal 720, and opening (orifice) 722. As illustrated, the gap 706, 706' is broadened due to the rotated position of the flap assembly 704 (specifically the flap pivot and flat pivot upper surface, both hidden from view).

FIG. 8 is an orthogonal side view illustrating an open position of a variable orifice assembly 800, similar to that depicted in FIG. 7. The variable orifice assembly 800 comprises a housing 802, flap assembly 804, gap 806, pivot pin 808, adjusting screw 810, and magnet 812. Again, as depicted in FIG. 6 and FIG. 7, the gap 806, is broadened by the rotated position of the flap assembly 804 (including the flap pivot and flap pivot upper surface, both hidden from view) when the flap assembly is rotated about the pivot pin 808.

Figure 9:
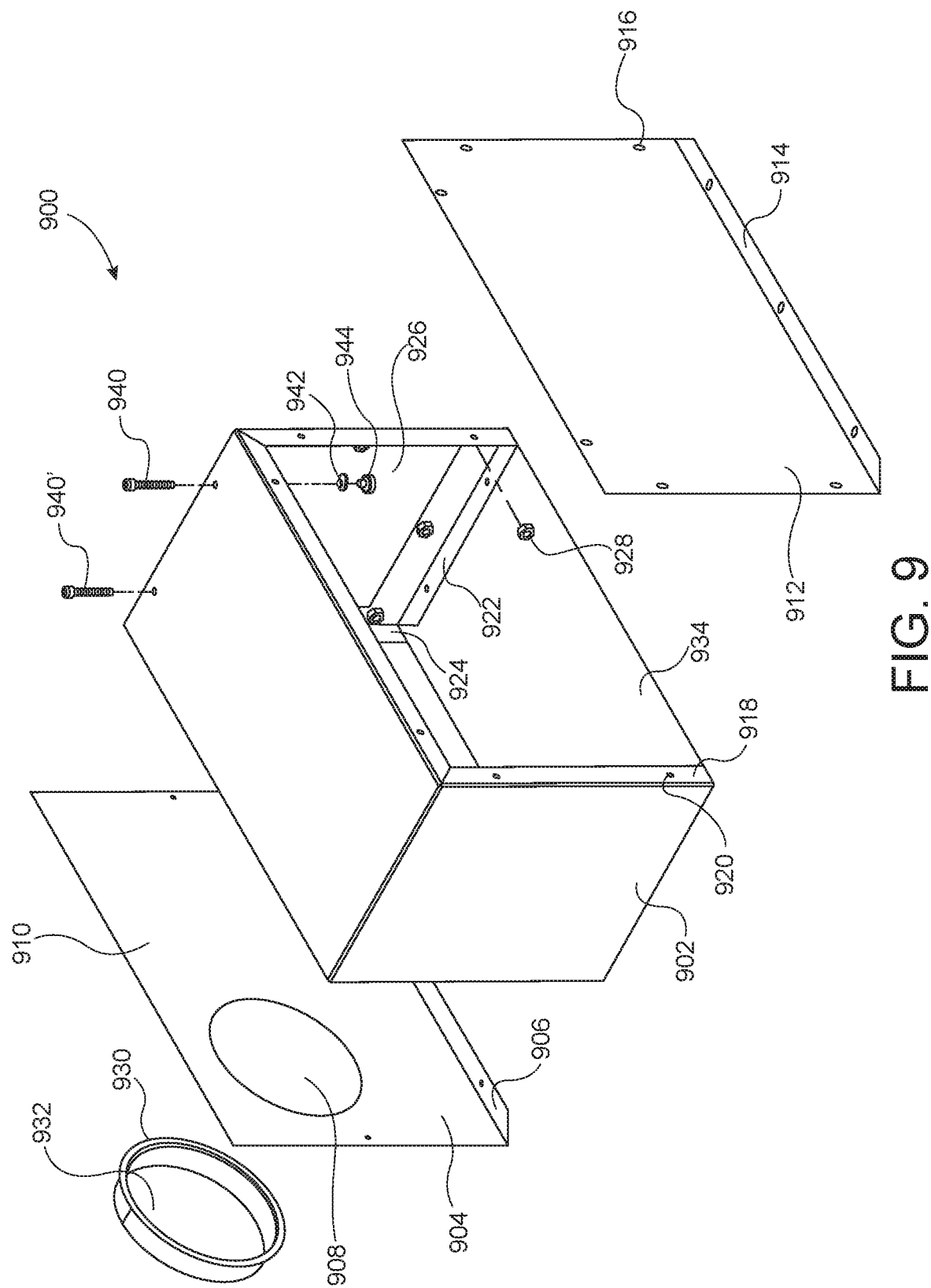
FIG. 9 depicts one embodiment shown in an exploded view illustrating a ducting box and related periphery components of a box body, front cover, rear cover, box adaptor weld nuts, and adjusting magnet assembly.

FIG. 9 is an isometric exploded view illustrating a duct box assembly 900 comprising a box body 902, box back cover 904, box back cover flange 906, box back cover orifice 908, box back cover fastener holes 910, box front cover 912, box front cover flange 914, box front cover fastener holes 916, box body front flanges 918, box body fastener holes 920, box body bottom flange 922, box body back flange 924, box body housing mounting hole/inlet 926, box body to housing weld nut 928, adaptor 930, adaptor through hole 932, box bottom 934, adjusting screw 940, 940', weld nuts 942, and magnets 944.

A housing mounting hole/inlet 926 is provided for insertion of a housing assembly (not shown). To secure the housing assembly to the duct box assembly, and notably the box body, box body to housing weld nuts 928 are provided on the interior of the box body for retaining fasteners. A weld nut 942 is secured to the interior upper surface of the box body 902 for each corresponding adjusting screw 940, 940' such that the adjusting screws 940, 940' can be retained and adjusted relative to the position of a flap assembly, and specifically relative to a flap pivot upper surface, as previously described herein.

When box body 902, box back cover 904, box front cover 912, box front cover flange 914, and box bottom 934, are joined by box back cover flange 906, box body front flanges 918, box body bottom flange 922, box body back flange 924, and fasteners (not shown) through box back cover fastener holes 910, box body fastener holes 920, box front cover fastener holes 916 an airtight compartment is fabricated for air to flow into a housing assembly mounted in the housing mounting hole/inlet 926 and out the adaptor through hole 932 when sufficient airflow and pressure differential across the flap assembly is present. The duct box assembly 900 may in some circumstances be fashioned without a bottom cover if the duct box can be mounted on an existing sealable surface of the system, therein further reducing complexity.

Figure 10:
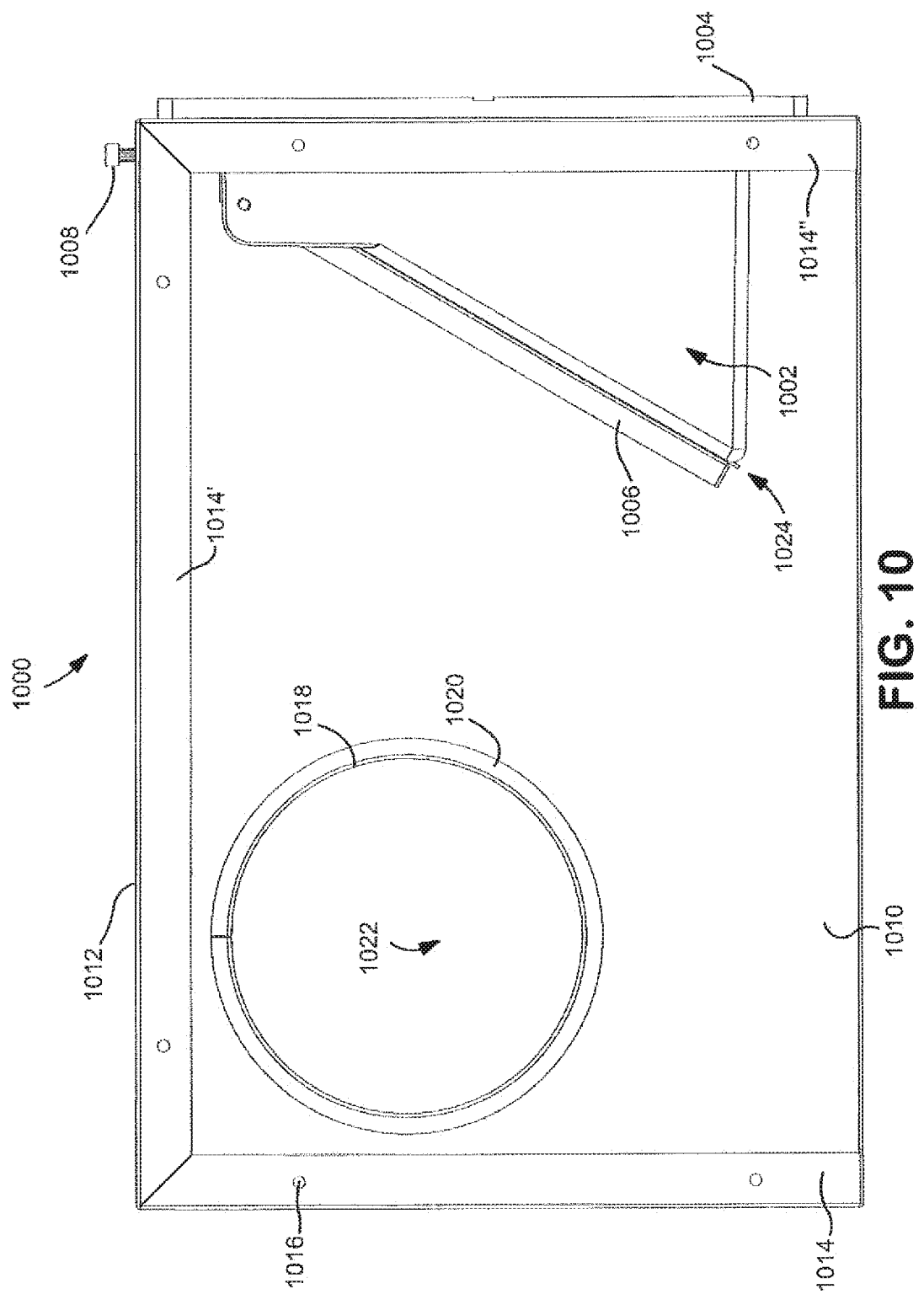
FIG. 10 depicts one embodiment shown in a side view of a ducting box comprising a housing, a flap assembly attached to the housing, adjusting screw assembly positioned in the ducting box over the magnetic portion of the flap assembly with the flap assembly in the closed position and front cover removed.

FIG. 10 is an orthogonal front view illustrating a variable orifice restrictive device 1000 without a front cover. The illustration depicts a housing 1002, a housing flange 1004, an adjusting screw 1008, a box back cover 1010, a box body 1012, box body flanges 1014, 1014', 1014", cover mounting holes 1016, a box adaptor 1018, a box adaptor flange 1020, an outlet opening 1022, and the closed position 1024 of the flap assembly 1006, as might exist with insufficient forward airflow, or during a backflow event. As is shown, a variable orifice restrictive device 1000 may be configured without a magnet. A variable orifice restrictive device 1000 may additionally comprises a magnet although it is not depicted herein.

Figure 11:
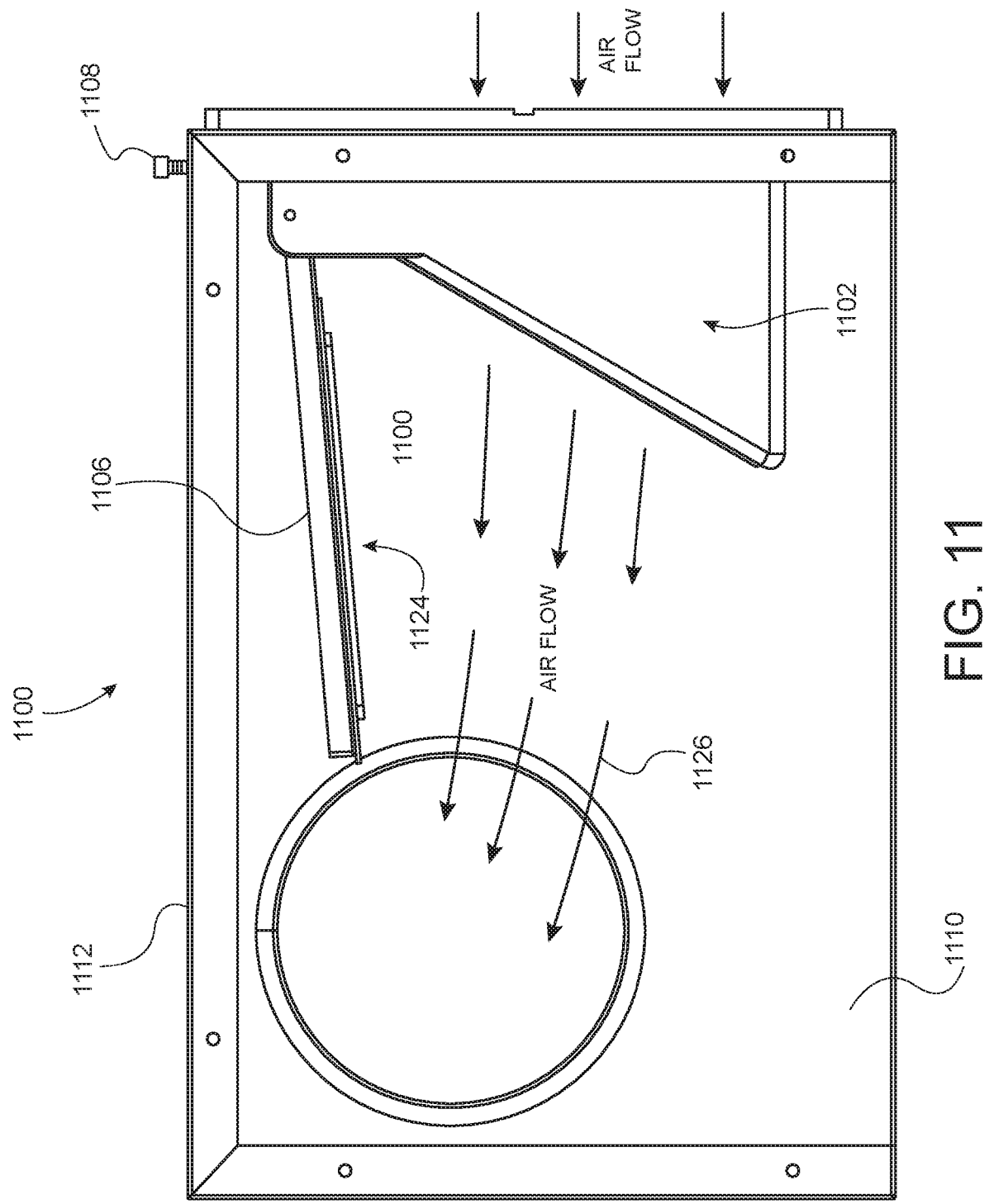
FIG. 11 depicts one embodiment shown in a side view of a ducting box comprising a housing, a flap assembly attached to the housing, adjusting magnet assembly positioned in the ducting box over the magnetic portion of the flap assembly with the flap assembly in the substantially open position and side cover removed.

FIG. 11 is an orthogonal front view illustrating a variable orifice restrictive device 1100 comprising a housing 1102, a flap assembly 1106, an adjusting screw 1108, a box back cover 1110, a box body 1112, and the open position 1124 of the flap assembly 1106, shown with restricted forward airflow 1126 that might be caused by sufficient pressure differential to overcome the weight and magnetic force that would otherwise keep the flap assembly 1106 closed. As is shown, a variable orifice restrictive device 1100 may be configured without a magnet. A variable orifice restrictive device 1100 may additionally comprises a magnet although it is not depicted herein.

Figure 12:
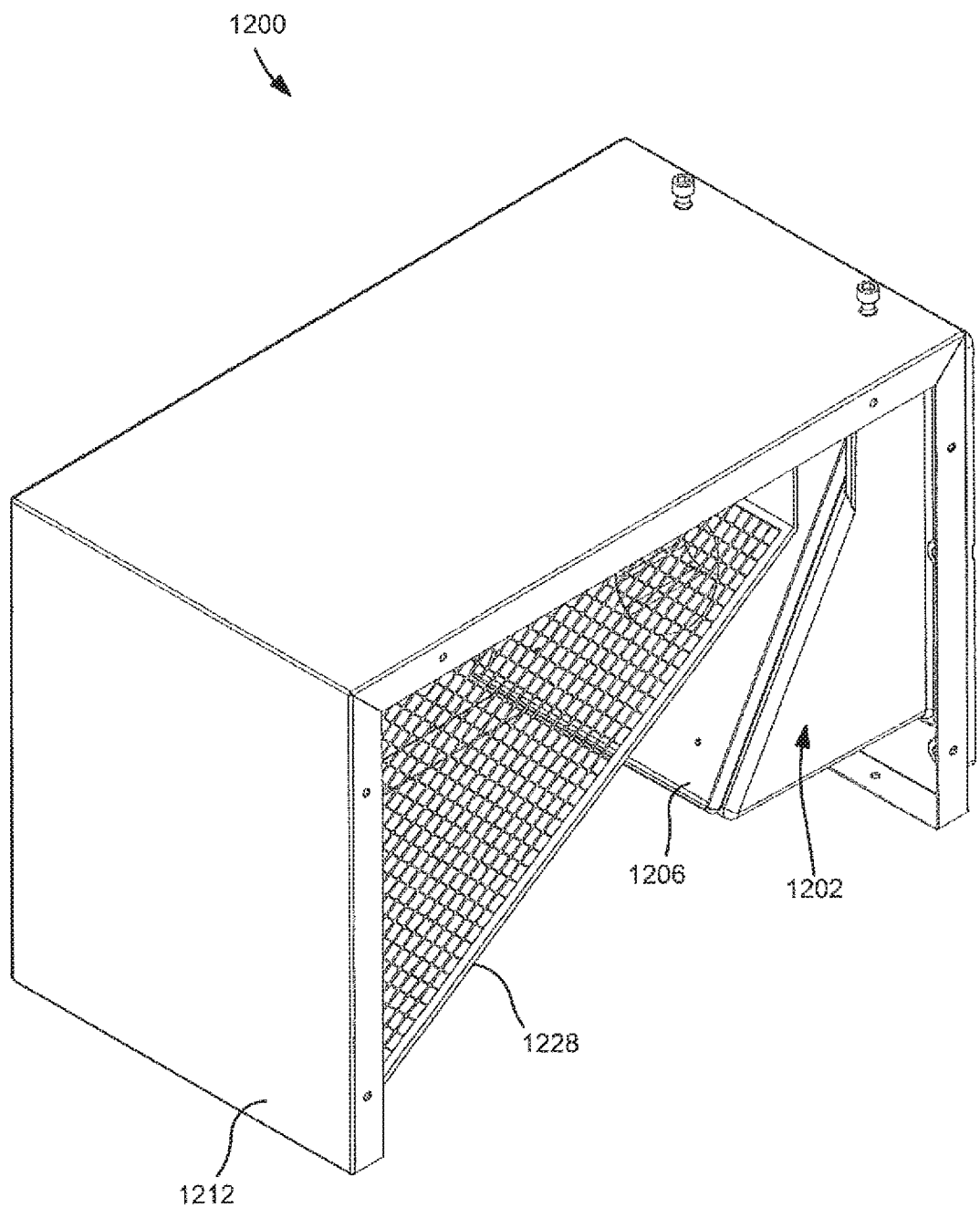
FIG. 12 depicts one embodiment shown in an isometric view of a ducting box comprising a limit screen positioned over a closed flap assembly to limit the maximum movement of the flap assembly.

FIG. 12 is an isometric view illustrating a variable orifice restrictive device 1200 in a closed arrangement, the variable orifice restrictive device 1200 comprising a box body 1212, a limiting screen 1228, a housing 1202, a flap assembly 1206, and a box back cover (obscured by the limiting screen 1228). The front and bottom cover are removed in the illustration for visual clarity.

Figure 13:
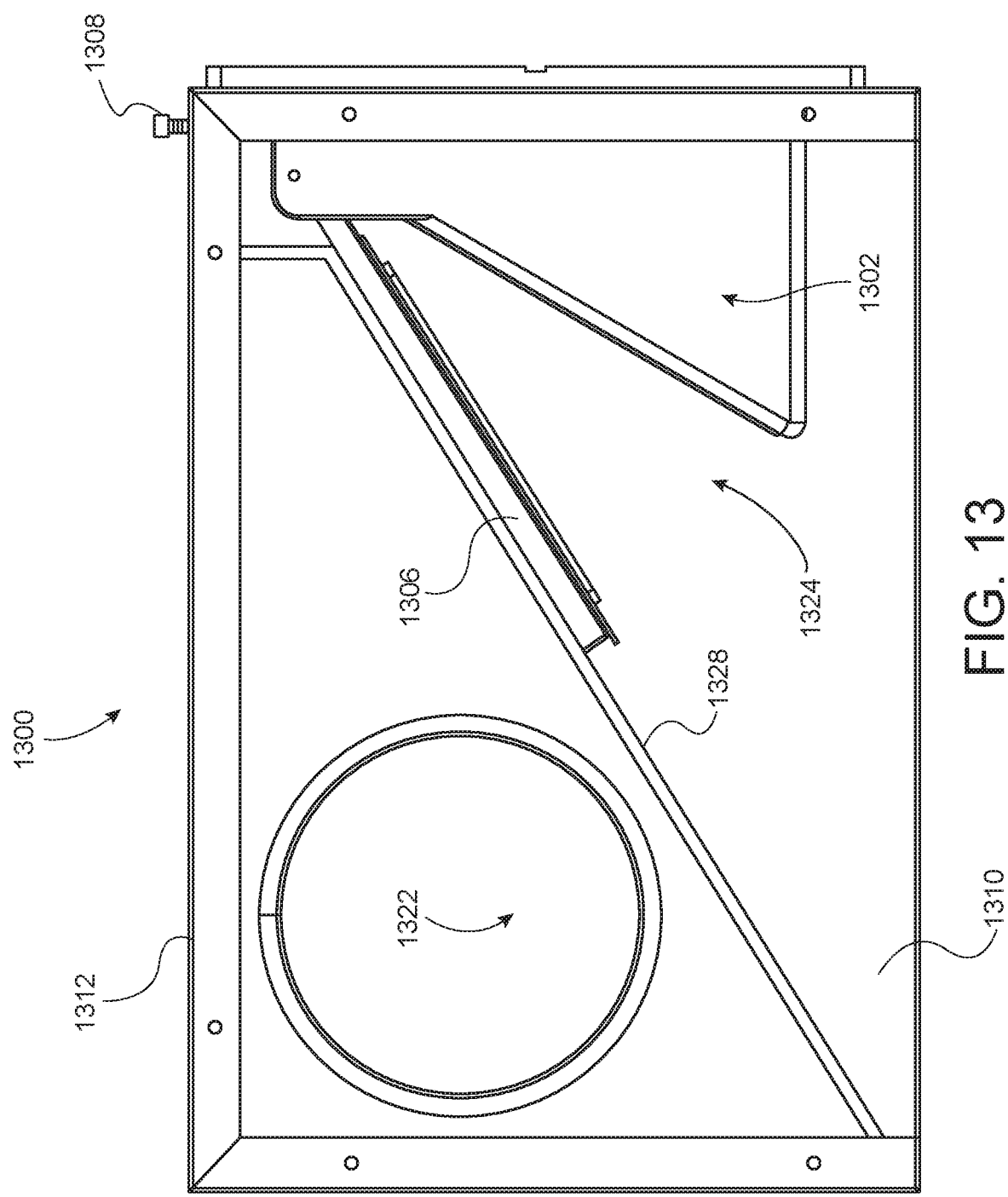
FIG. 13 depicts one embodiment shown in a side view of a ducting box comprising a limit screen positioned over an open flap assembly at or about the maximum opening of the orifice.

FIG. 13 is an orthogonal front view illustrating a variable orifice restrictive device 1300 in an open position 1324. The front cover is set aside for the illustration. The variable orifice restrictive device 1300 of the illustration depicts a housing 1302, limiting screen 1328, a flap assembly 1306, an adjusting screw 1308, a box back cover 1310, a box body 1312, and outlet opening 1322, wherein the flap assembly 1306 is in an open position 1324, as might exist with sufficient forward airflow during normal operation. As is shown, a variable orifice restrictive device 1300 may be configured without a magnet. A variable orifice restrictive device 1300 may additionally comprises a magnet although it is not depicted herein. The limiting screen 1328 is shown to limit the movement of the flap assembly 1306 to a maximum position. The limit screen 1328 may be attached to the box body 1312 as shown by fasteners, adhesives, or welding, or can be secured by clips internally that allow simple removal. The limiting screen 1328 can further act as a filtering or debris screen, should something enter the airflow. During operation, and provided sufficient flow and pressure differential are applied, air will flow into the housing inlet through the orifice, being in the open position 1324, and through the limit screen 1328, finally passing out the outlet opening 1322.

FIG. 14 is a cross section view illustrating a closed flap pivot arrangement 1400, such as in the embodiments depicted in FIGS. 1, 3, 4, 5, 10, and 12, and as might exist if minimal forward airflow occurs due to an insufficient pressure differential, or during a backflow event. Depicted is an adjusting screw 1408 with corresponding magnet 1406 over a flap pivot 1404, having a 'closed' gap 1402 relative to the flap pivot upper surface 1410; the flap pivot is able to rotate about the pivot hole/pin 1412. The adjusting screw is held in position by a retaining nut (not shown) affixed to a box body or other part of duct box (not shown); the adjusting screw passing through the box body and retaining nut, such as seen in FIG. 9. Increases in magnet action on the flap assembly may be adjusted during fabrication. For example, the pivot pin 1412 can be moved forward relative to the centerline of the magnet(s), and/or the flap upper surface extended distal from and perpendicular to the pivot pin axis, thereby increasing the moment and forces the magnet would have on a flap assembly for a given gap.

A flap cover (not shown) would be affixed to the flap-pivot-to-cover mounting flange 1414, as further illustrated in FIG. 15. Turning to FIG. 15, there is a cross section view illustrating an open flap pivot arrangement 1500. The flap pivot 1504 and flap cover 1516, joined by mating the flap-pivot-to-cover mounting flange 1514 to the flap cover mounting flange 1518, are rotated about the pivot hole/pin 1512 when compared to the arrangement depicted in FIG. 14. Upon rotation of the flap pivot 1504 from the closed position to the open position, the open gap 1502 between the flap pivot upper surface 1510 and the magnet 1506 increases as seen, thereby lessening the effect of the magnet on the flap pivot upper surface 1510, or the portion of the flap pivot upper surface that is magnetic. As stated previously, the adjusting screw 1508 threaded through a box body, such as that depicted in FIGS. 1, 9-13, can be used to adjust the height of the magnet relative to the flap upper surface 1510. When the flap assembly rests in the closed position, the face of the magnet is substantially parallel to the flap upper surface 1510. Upon rotation about the pivot hole/pin 1512, the surface separates in an arcing fashion.

Figure 16:
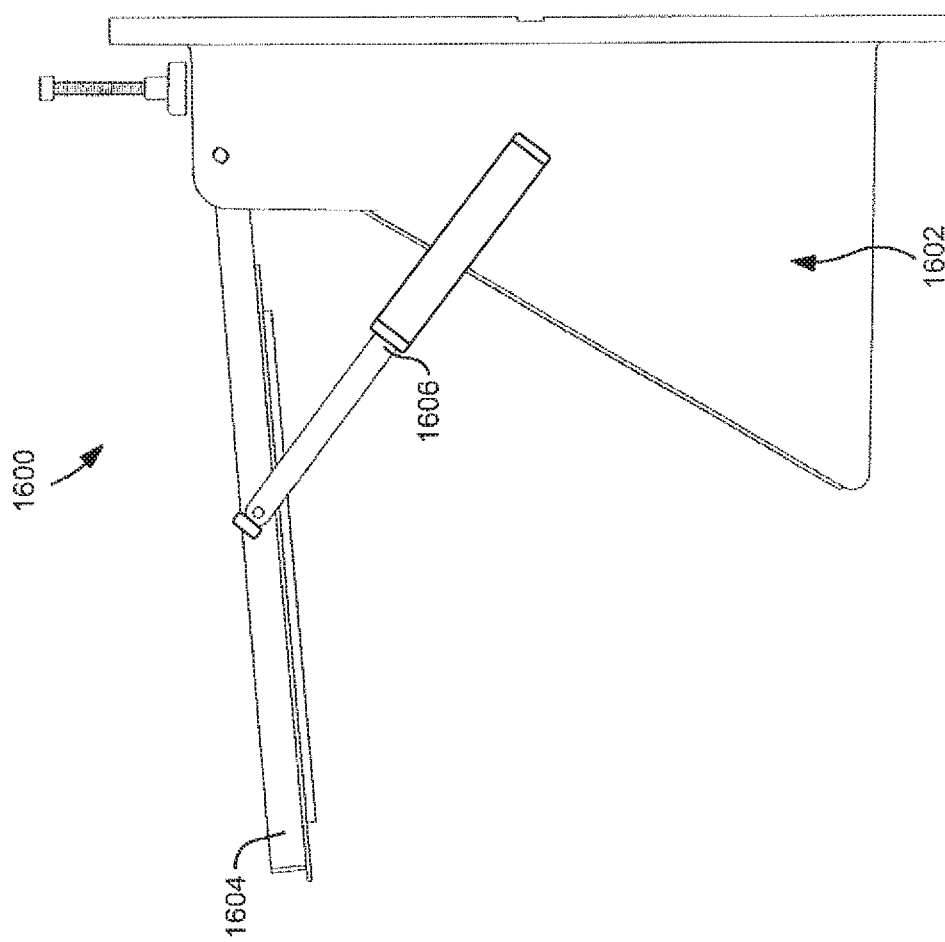
FIG. 16 depicts one embodiment shown in an orthogonal side view of a variable orifice assembly having a rate regulating device attached between the flap assembly and the housing.

FIG. 16 is an orthogonal side view of a variable orifice assembly 1600 comprising a housing 1602, a flap assembly 1604, and regulator 1606. The regulator 1606 may regulate the rate of opening/closing and be either a spring, damper of some other device fashioned to control the rate of movement of an object. In the illustration, the regulator is attached between the housing 1602 and the flap assembly 1604. Other arrangements can be fabricated to suit the desired rate of opening/closing. The regulator as shown pivots upon the two attaching points. Additional pivots may be fashioned, such as might be used for a rotary damper or spring. The regulator may also regulate the maximum degree of opening for the flap assembly and may work across the entire range of movement of the flap assembly or a portion of the movement, such as at one end or in the middle or a combination.

Figure 17:
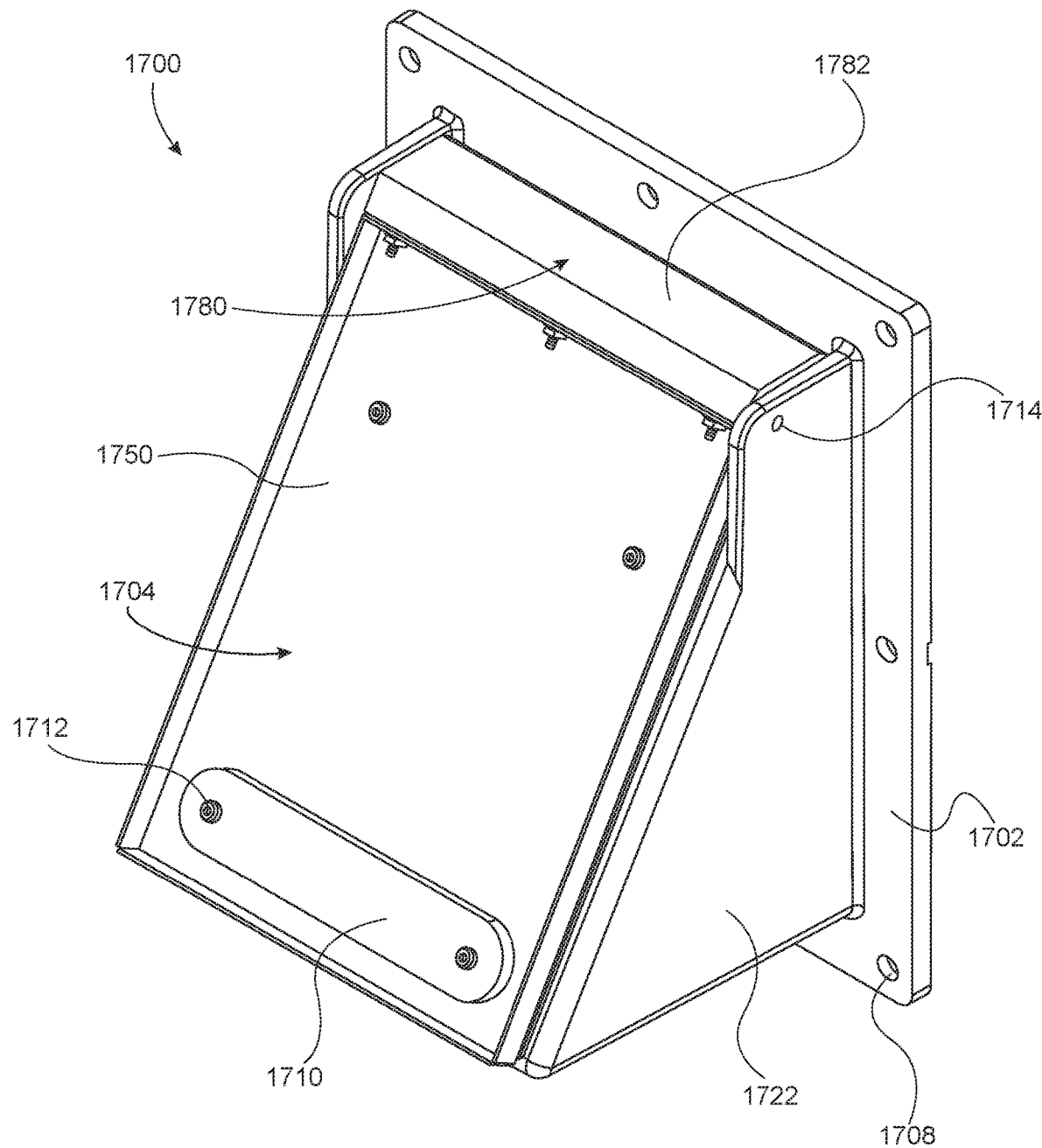
FIG. 17 depicts one embodiment shown in an isometric view of a housing and a flap assembly with a weight position on the flap cover with the flap assembly in the closed position.

FIG. 17 is an isometric view illustrating a variable orifice assembly 1700 in the closed position. The variable orifice assembly 1700 comprises a housing 1722, a housing mounting flange 1702, a flap pivot 1780, and a flap assembly 1704. The illustration further depicts a weight 1710 positioned on the flap cover 1750 of the flap assembly 1704 to provide additional closing force offered by the weight 1710. The weight 1710 may be fixed on the flap cover 1750 by a weight fastener 1712. The weight fastener 1712 may be a screw, an adhesive, or may be done by other known joining methods. In addition to the weight of the flap assembly 1704, the weight 1710 adds additional weight so that the pressure differential across the flap assembly 1704 required to rotate the flap assembly 1704 is higher.

FIG. 17 shows only one weight 1710 positioned on the flap cover 1750 by way of example. However, current invention is not limited to the FIG. 17, and the variable orifice assembly 1700 may comprise more than one weight 1710. For example, the variable orifice assembly 1700 may comprise two weights 1710 or the variable orifice assembly 1700 may comprise more than three weights 1710. The shape of the weight 1700 is also not limited to the shape shown in FIG. 17, and may comprise other shapes, such as rectangular, cylindrical, or other shapes deemed proper. As such, a weight of the weight 1710 may be configured according to the specific variable orifice assembly 1700. The weights 1710 may be stackable and may be made in any desired thickness to increase or decrease weight, for example a ¼" thick weight may be 0.5 lbs. and a ⅛" thick weight may be 0.25 lbs. The weight 1710 may be made from any desired material, for example aluminum or steel. Likewise, the flap cover 1750 may be made from any desired material, for example aluminum or steel. For example, the flap cover 1750 made from aluminum may be 0.57 lbs. and the flap cover 1750 made from steel is 1.66 lbs. When a device requires more pressure differential across the flap assembly 1704, a heavier weight 1710 may be installed. Likewise, a location of the weight 1710 may be different from the location of the weight 1710 in FIG. 17 to provide adequate pressure differential across the flap assembly 1704 required to rotate the flap assembly 1704. For example, when less pressure differential is necessary, a weight 1704 may be positioned on the upper side of the flap cover 1750 of the flap assembly 1704. However, when more pressure differential is required, a weight 1704 may be positioned on the lower side of the flap cover 1750 of the flap assembly 1704.

Figure 18:
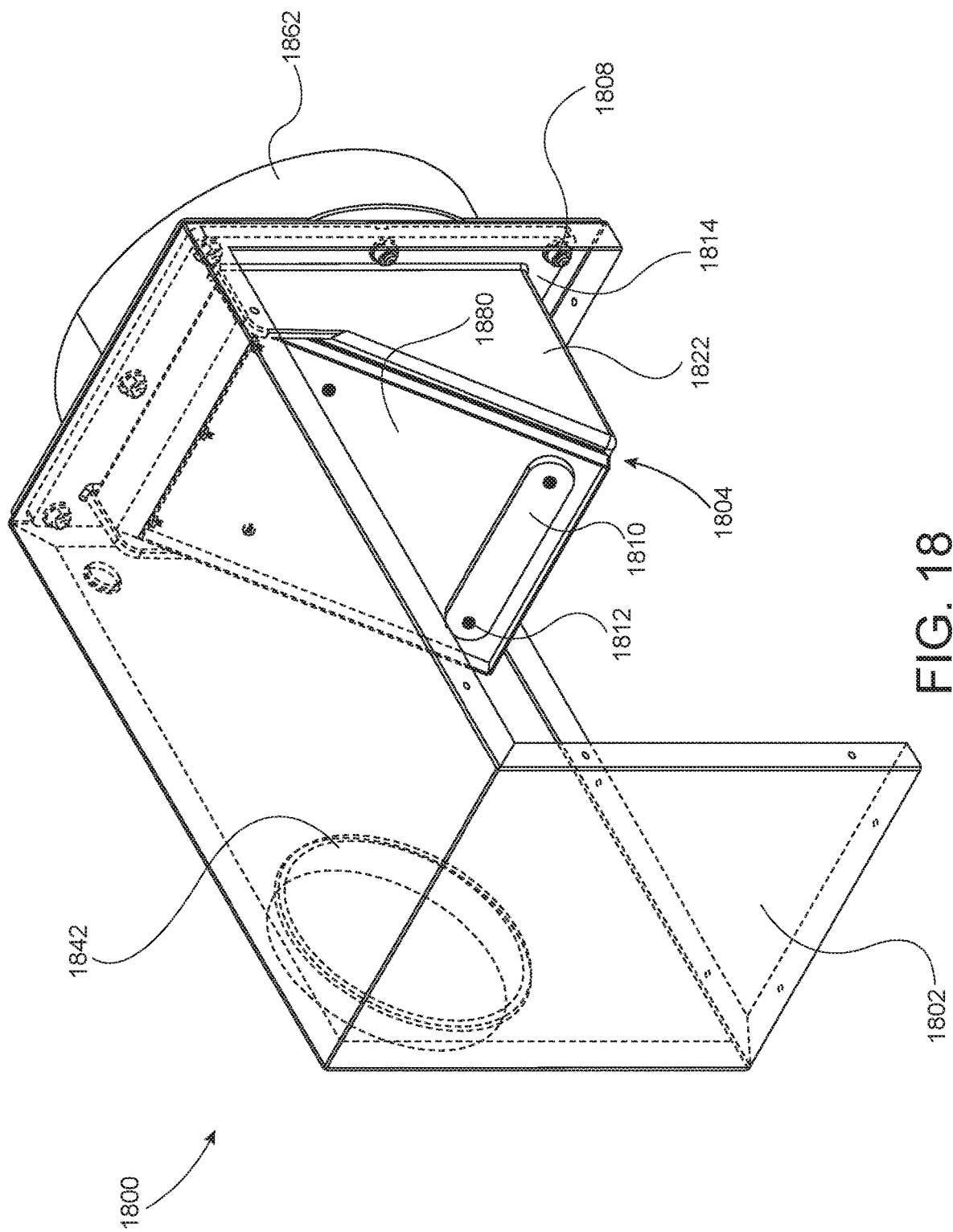
FIG. 18 depicts one embodiment shown in an isometric view of a housing and a flap assembly with a weight position on the flap cover with the flap assembly in the closed position contained within a ducting box with the front cover removed.

FIG. 18 is an isometric view illustrating a variable orifice restricting device 1800 with the front cover removed. The variable orifice restricting device 1800 may comprise a box body 1802, a flap assembly 1804, a housing 1822, an outlet opening 1842, and a device inlet 1862. The flap assembly 1804 may comprise a flap cover 1880, a weight 1810, and a weight fastener 1812. The housing 1822 is inserted into the box body 1802 via an inlet hole, such as, for example, the box body housing mounting inlet 926 of FIG. 9, wherein the housing mounting flange 1814 may mate with the inner surface of the box body 1802. It is noted that the housing mounting flange may mate with outer surface of the box body as shown in FIG. 1. The housing 1822 is fixed to the box body 1802 by housing mounting flange fasteners 1808. The housing mounting flange fasteners 1808 may be a screw, an adhesive, or may be done by other known joining methods. As described, the weight 1810 may have different shape and weight, may be located on different position, and there may be more than one weight 1810.

When blower/fan operated, air comes into the housing 1822 from the device inlet 1862. If there is enough pressure to overcome the force on the flap assembly 1804, the flap assembly 1804 will rotate to allow air to pass to the box body 1802. The force on the flap assembly 1804 may depend on, for example, a weight of the flap assembly 1804, a weight of the weight 1810, a number of the weight 1810, a location of the weight 1810, magnetic force of the magnet (not shown), or other force done by other known mechanism. When the flap assembly 1804 rotates, air passes to the box body 1802 and will leave the box body 1802 through the outlet opening 1842. Although the device inlet 1862 and the outlet openings 1842 are circular in FIG. 18, it may take different shape to serve the same purpose. The outlet opening 1842 may have a screen, or it may be hollow. Likewise, the device inlet 1862 may have a screen, or it may be hollow.

Exemplary numbered embodiments of the invention are shown below:

1. A variable orifice restrictor for an air induction system of a gas fired boiler, the variable orifice restrictor comprising:
   a. a ducting box having a box inlet and a box outlet;
   b. a housing having a seat, a housing inlet, and a housing outlet, said housing insertedly attached to said ducting box; and
   c. a flap assembly hingedly attached to said housing and closed by a holding force, and configured to rotate in response to a pressure differential between said ducting box and said housing that is greater than the holding force,
   d. wherein said variable orifice restrictor provides a turndown ratio of an air flow rate through said air induction system via said flap assembly, said housing, and said ducting box.

2. The variable orifice restrictor of embodiment 1, wherein said holding force is based on a weight of said flap assembly.

3. The variable orifice restrictor of embodiment 1 or 2, wherein said holding force is based on a weight arranged on said flap assembly.

4. The variable orifice restrictor of any one of embodiments 1-3, wherein said holding force is based on an adjustable magnet assembly arranged on said ducting box and configured to interact with said flap assembly.

5. The variable orifice restrictor of any one of embodiments 1-4, wherein said holding force is based on an angle of a closed position of said flap assembly.

6. The variable orifice restrictor of any one of embodiments 1-5, further comprising a regulator arranged on said housing and said flap assembly and configured to regulate said rotation of said flap assembly.

7. The variable orifice restrictor of c any one of embodiments 1-6, further comprising a limiter arranged in said ducting box and configured to limit said rotation of said flap assembly.

8. The variable orifice restrictor of any one of embodiments 1-7, wherein said flap assembly is configured to rest against said seat and seal thereto in a closed position.

9. The variable orifice restrictor of any one of embodiments 1-8, wherein said flap assembly comprises a low air flow rate orifice calibrated to a predetermined maximum airflow.

10. The variable orifice restrictor of any one of embodiments 3-9, wherein said weight is attached to said flap assembly.

11. The variable orifice restrictor of any one of embodiments 3-9 wherein said weight is integral in said flap assembly.

12. The variable orifice restrictor of any one of embodiments 3-9, wherein a weight of said weight is configured to said pressure differential between said ducting box and said housing required to break said holding force.

13. The variable orifice restrictor of any one of embodiments 3-9, wherein a number of said weight is configured to said pressure differential between said ducting box and said housing required to break said holding force.

14. The variable orifice restrictor of any one of embodiments 3-9, wherein a location of said weight is configured to said pressure differential between said ducting box and said housing required to break said holding force.

15. The variable orifice restrictor of embodiment 7, wherein said limiter is arranged in an angle, said angle configured to limit a degree of said rotation of said flap assembly.

16. The variable orifice restrictor of embodiment 8, wherein said seal is configured for back-flow prevention.

17. The variable orifice restrictor of any one of embodiments 1-16, wherein said turndown ratio of an air flow rate is better than 5 to 1.

18. The variable orifice restrictor of any one of embodiment of 1-17, wherein said restrictor provides an improved turndown ratio.

19. The variable orifice restrictor of any one of embodiments 1-18, wherein said boiler is oil fired.

STATEMENT REGARDING PREFERRED EMBODIMENTS

While the invention has been described with respect to the foregoing, those skilled in the art will readily appreciate that various changes and/or modifications can be made to the invention without departing from the spirit or scope of the invention as defined by the appended claims.

What is claimed is:

1. A variable orifice restrictor for an air induction system of a gas fired boiler, the variable orifice restrictor comprising:
   a ducting box having a box body, a box body housing mounting inlet, and a box outlet;
   a housing having a seat, a housing inlet, and a housing outlet, the housing inserted via the box body housing mounting inlet and attached to the ducting box; and
   a flap assembly comprising a flap cover and a flap pivot, the flap assembly hingedly attached to the housing and closed by a holding force from a weight directly attached to the flap cover with a weight fastener at a discrete position on the flap cover, wherein the weight is shaped and configured to span a portion of the width of the flap cover and a location of the weight is configured to vary from a first discrete position on the flap cover to a second discrete position on the flap cover, wherein the flap assembly is configured to rotate in response to a pressure differential between the ducting box and the housing that is sufficient to overcome the holding force, and the flap assembly further including a limiter provided in the form of a screen coupled to the ducting box to limit rotation of the flap assembly,
   wherein the variable orifice restrictor provides a turndown ratio of an air flow rate through the air induction system via the flap assembly, the housing, and the ducting box.

2. The variable orifice restrictor of claim 1, further comprising a regulator arranged between a first side of the housing and a second corresponding side of the flap assembly and configured to regulate the rotation of the flap assembly.

3. The variable orifice restrictor of claim 1, further comprising a limiter arranged in the ducting box and configured to limit the rotation of the flap assembly, wherein the limiter is selected from at least one of a panel, a screen, a bolt, or an adjustable device.

4. The variable orifice restrictor of claim 3, wherein the limiter is arranged in an angle, the angle configured to limit a degree of the rotation of the flap assembly.

5. The variable orifice restrictor of claim 1, wherein the flap assembly is configured to rest against the seat and seal thereto in a closed position.

6. The variable orifice restrictor of claim 5, wherein the seal is configured to prevent backflow.

7. The variable orifice restrictor of claim 1, wherein the flap assembly comprises a low air flow rate orifice calibrated to a predetermined maximum airflow.

8. The variable orifice restrictor of claim 1, wherein the weight is provided in the form of a magnet.

9. The variable orifice restrictor of claim 1, wherein the holding force is based on an amount of the weight.

10. The variable orifice restrictor of claim 1, wherein the turndown ratio of the air flow rate is better than 5 to 1.

11. The variable orifice restrictor of claim 1, wherein the variable orifice restrictor provides an improved turndown ratio.

12. The variable orifice restrictor of claim 1, wherein the flap assembly comprises a restricting orifice and a rotatable cover plate configured to cover the restricting orifice.

13. The variable orifice restrictor of claim 1, wherein the ducting box comprises:
   a top cover;
   a first side cover substantially perpendicular to the top cover; and
   a back cover extending outward from and substantially perpendicular to the first side cover and coupled to at least one of the top cover and the first side cover,
   wherein the box inlet is formed within the first side cover,
   wherein the box outlet is formed within the back cover.

14. The variable orifice restrictor of claim 13 further comprising a screen to limit rotation of the flap assembly coupled at an angle with respect to the top cover of the ducting box and a second side cover extending from the top cover of the ducting box.

15. The variable orifice restrictor of claim 1, wherein the first discrete position of the weight is on an upper side of the flap cover and the second discrete position of the weight is on a lower side of the flap cover, the first discrete position designed to enable the flap cover to rotate in response to a first pressure differential acting across the flap assembly and the second discrete position designed to enable the flap cover to rotate in response to a second pressure differential acting across the flap assembly, the second pressure differential being greater than the first pressure differential.

16. The variable orifice restrictor of claim 1, wherein the box outlet is proximate a box top cover of the ducting box.

17. The variable orifice restrictor of claim 1, wherein air flows orthogonally through the ducting box from the box body housing mounting inlet to the box outlet.

18. The variable orifice restrictor of claim 1, wherein the box body is substantially rectangular in shape.

19. The variable orifice restrictor of claim 1, wherein the ducting box has a box back cover, the box outlet is disposed on the box back cover, and the box body housing mounting inlet is disposed on a surface adjacent to the box back cover.

20. The variable orifice restrictor of claim 1, wherein the flap pivot is attached to the flap cover via a pivot pin.

21. The variable orifice restrictor of claim 1, wherein the housing is attached to an inner surface of the box body.

22. The variable orifice restrictor of claim 21, wherein the housing has a housing mounting flange attached to the inner surface of the box body with a housing mounting flange fastener.

23. The variable orifice restrictor of claim 1, wherein the weight is planar and has rounded ends.

\* \* \* \* \*